US006560675B1

(12) United States Patent
Aho et al.

(10) Patent No.: US 6,560,675 B1
(45) Date of Patent: May 6, 2003

(54) METHOD FOR CONTROLLING CONCURRENT CACHE REPLACE AND RETURN ACROSS AN ASYNCHRONOUS INTERFACE

(75) Inventors: Eric D. Aho, Phoenixville, PA (US); Philip C. Bolyn, Norristown, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/476,293

(22) Filed: Dec. 30, 1999

(51) Int. Cl.[7] .............................................. G06F 12/00
(52) U.S. Cl. ...................... 711/118; 711/163; 711/207
(58) Field of Search ................................ 711/104, 163, 711/120, 118, 207, 127, 143, 146, 137, 138; 710/128, 39, 105

(56) References Cited

U.S. PATENT DOCUMENTS

| | | | | |
|---|---|---|---|---|
| 4,805,098 A | * | 2/1989 | Mills, Jr. et al. ............ | 711/118 |
| 5,224,214 A | * | 6/1993 | Rosich ......................... | 710/39 |
| 5,295,253 A | * | 3/1994 | Ducousso et al. ........... | 711/267 |
| 5,339,399 A | * | 8/1994 | Lee et al. .................... | 711/146 |
| 5,469,558 A | * | 11/1995 | Lieberman et al. ......... | 710/105 |
| 5,485,592 A | * | 1/1996 | Lau ............................. | 711/143 |
| 5,689,680 A | * | 11/1997 | Whittaker et al. ........... | 711/127 |
| 5,857,082 A | * | 1/1999 | Murdoch et al. ............ | 710/128 |
| 5,860,112 A | * | 1/1999 | Langendorf et al. ........ | 711/143 |
| 5,900,012 A | * | 5/1999 | Tran ............................ | 711/120 |
| 6,032,229 A | * | 2/2000 | Hotta et al. .................. | 711/137 |
| 6,205,514 B1 | * | 3/2001 | Pawlowski .................. | 711/104 |
| 6,223,258 B1 | * | 4/2001 | Palanca et al. ............. | 711/138 |

* cited by examiner

Primary Examiner—David Hudspeth
Assistant Examiner—Fred F. Tzeng
(74) Attorney, Agent, or Firm—Woodcock Washburn; Lise A. Rode; Mark T. Starr

(57) ABSTRACT

The present invention provides a method and a computer system that compares a portion of a signal and information transferred from a cache memory, while the information is in transit from the cache memory. The information may be routed differently depending on the outcome of the compare. Specifically, the information may be delivered to a memory bus when it matches the portion of the signal and when the signal is a read command. Alternatively, the information may not be delivered to a memory bus when it matches the portion of the signal and when the signal is a write command. If the information does not match the portion of the signal, it may be transferred to a main memory via a memory bus. The information may be compared to the portion of the signal for a first time interval, and the portion of the signal may be compared to the information for a second time interval. The information may be transferred from the cache memory on a first clock signal, while the signal is provided by the memory bus on a second clock signal asynchronous with the first clock signal.

23 Claims, 6 Drawing Sheets

METHOD FOR CONTROLLING CONCURRENT CACHE REPLACE AND RETURN ACROSS AN ASYNCHRONOUS INTERFACE

FIELD OF THE INVENTION

The present invention generally relates to cache memory devices. More particularly, the present invention relates to routing cache information from a cache memory.

BACKGROUND OF THE INVENTION

Traditionally, increases in microprocessor speeds have outpaced the speeds of other component modules that communicate with the microprocessor over a memory bus. For example, main memory storage modules, like RAM, are often significantly slower than the microprocessor. As a result, the microprocessor often must wait for the slower main memory in order to execute instructions. This fails to take advantage of the developments in microprocessor technology and reduces overall efficiency by causing bottlenecks on the memory bus.

Cache memory devices have been created to reduce the inefficiencies associated with main memory modules. Cache is a faster response memory than main memory. In addition, cache often is located on the same chip as the microprocessor, and thus instructions and data requested by the microprocessor do not have to travel to the slower memory bus. When the microprocessor wishes to execute an instruction or retrieve data, it first checks the cache to determine whether the required instruction or data is available in cache. Cache is designed to store instructions and data that statistically are more likely to be needed by the microprocessor. When the microprocessor requests an instruction or data that resides in the cache, a cache "hit" occurs and the cache quickly provides the information to the microprocessor. When the microprocessor requests information that is not in the cache, a cache "miss" occurs and the microprocessor must retrieve the information from the slower main memory via the main memory bus. Following a cache "miss," the unmatching data located in the cache is replaced with the most recently requested information from the microprocessor. Often, the unmatching data must be removed from the cache and sent back to main memory via the main memory bus. This process is commonly referred to as a "Replace."

In the past, cache was designed to be synchronous, or at least in lock step, with the main memory bus. Recently, however, cache devices have been designed to operate on a core clock domain, asynchronous to the bus clock domain on which the main memory bus operates. As a result, during the Replace, the non-matching data must cross an asynchronous clock boundary as it leaves the cache and enters the main memory bus.

The asynchronous boundary causes a problem when another agent on the main memory bus (e.g., another processor) requests the non-matching data as it is in transit from the cache to the main memory bus. This request from another agent is commonly called a "Return." A Return is asynchronous to a Replace because the Replace is delivered to the main memory bus domain from the core clock domain and the Return is requested by an agent on the memory bus domain. Because a Replace and a Return are conducted independent of one another, it is possible for a Return to request information that is in transit back to main memory as the result of a Replace operation. Currently, cache memory does not consider information in transit to the memory bus to be within its domain. As such, for information in transit, the cache will respond to a Return request in the negative, thus requiring the agent to query main memory. However, because of various buffers and protocols, the agent may retrieve the requested information from main memory before the Replace information has reached its main memory destination. As a result, the agent may receive corrupted (i.e., not yet updated) data from main memory.

When a Replace and a Return are conducted on synchronous clocks (i.e., when cache operations are synchronous with memory bus operations), this conflict may be resolved through timing techniques. For example, a Return request may be required to wait a certain number of clock cycles before retrieving information from main memory in order to ensure that the data will be updated by a Replace. However, when a Replace and a Return are conducted on asynchronous clocks (i.e., when cache operations are asynchronous with memory bus operations), it impossible to resolve to a particular clock when the Replace information is written to the memory bus relative to an incoming Return requested by another agent.

Therefore, it would be advantageous to be able to compare a Return request with Replace information as the Replace information is in transit across the asynchronous boundary from the cache to the main memory bus.

SUMMARY OF THE INVENTION

The present invention provides a method and computer system that compares a portion of a signal and information transferred from a cache memory, while the information is in transit from the cache memory. The information may be routed differently depending on the outcome of the compare. Specifically, the information may be delivered to a memory bus when it matches the portion of the signal and when the signal is a read command. If the information does not match the portion of the signal, it may be transferred to a main memory via the memory bus. The information may be compared to the portion of the signal for a first time interval, and the portion of the signal may be compared to the information for a second time interval. The information is transferred from the cache memory on a first clock signal, while the signal is provided by the memory bus on a second clock signal asynchronous with the first clock signal.

The signal may be a request provided by an agent coupled to the memory bus. The information may be stored in a first buffer element on a first clock signal, while the request signal may be stored in a second buffer element on a second clock signal that is asynchronous to the first clock signal. In this instance, a comparator, coupled to the buffer elements, compares the information in the first buffer element to a portion of the request signal in the second buffer element for a first time interval. The first time interval may include multiple clock pulses up to a clock pulse in which the second buffer element receives the request signal. The comparator then compares the portion of the request signal to the information for a second time interval. The second time interval may include one clock pulse after the first buffer element receives the information. Both compares may be conducted on the first clock signal.

Other features of the present invention are disclosed below.

BRIEF DESCRIPTION OF THE DRAWINGS

A computer system in accordance with the present invention is further described with reference to the accompanying drawings in which.

DETAILED DESCRIPTION OF PREFERRED EMBODIMENTS

Figure 1:
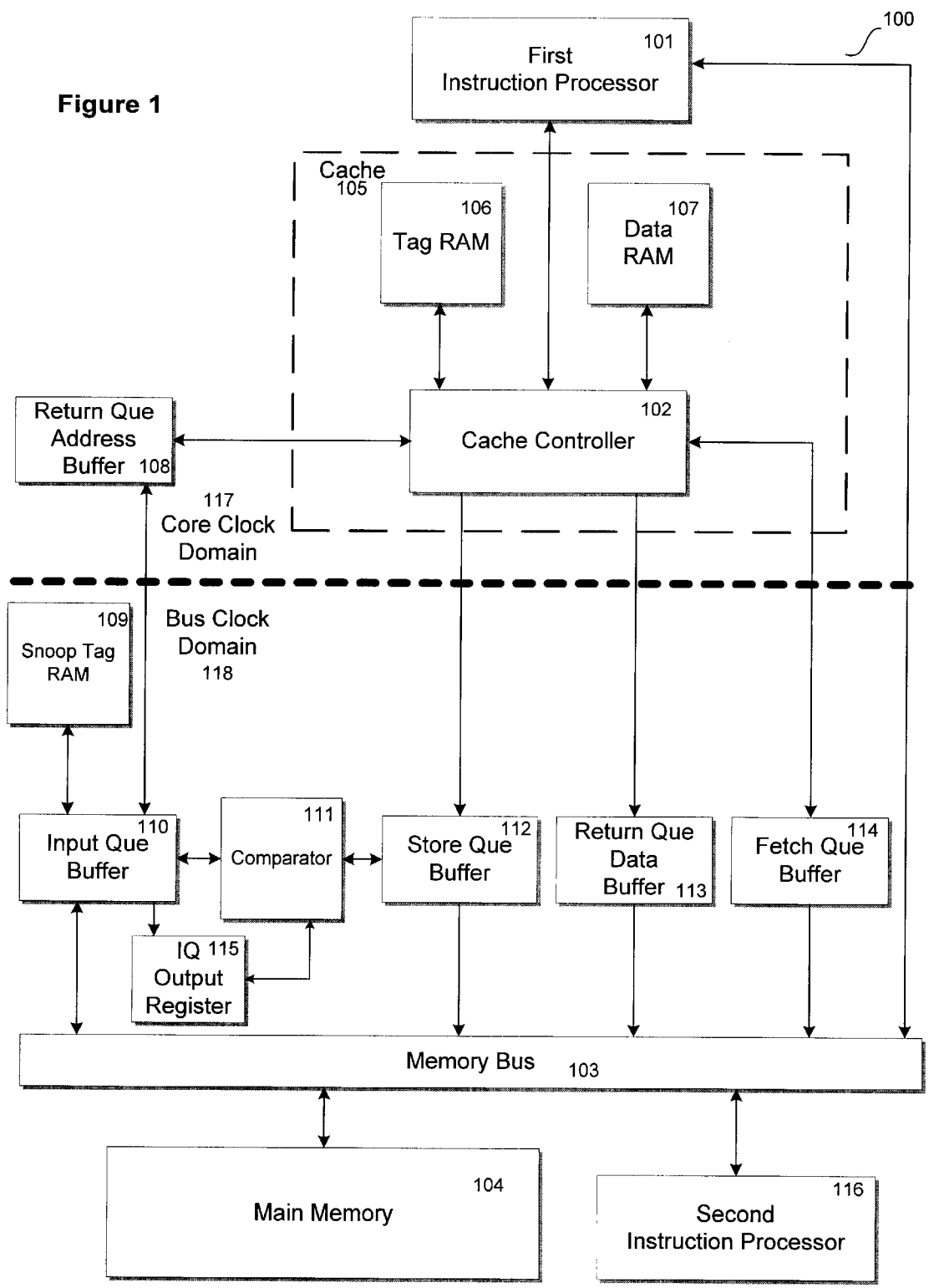
FIG. 1 is block diagram illustrating a computer system according to a preferred embodiment of the present invention.

FIG. 1 is a block diagram illustrating a computer system 100 according to a preferred embodiment of the present invention. A first instruction processor 101 is coupled to a cache controller 102 located in a cache 105. First instruction processor 101 also is coupled to a memory bus 103 that allows first instruction processor 101 to access a main memory 104. First instruction processor 101 may request address and data information from cache 105 or main memory 104. Because cache 105 is a high-speed storage device, much faster than main memory 104, first instruction processor 101 looks first to cache 105 to determine whether the requested information is available. If the requested information is not available in cache 105, first instruction processor 101 retrieves the information from main memory 104.

Cache 105 is comprised of a tag RAM 106, a data RAM 107 and cache controller 102. Cache controller 102 is coupled to tag RAM 106 and data RAM 107. Because many cache architectures permit a plurality of main memory addresses to map to each cache line (as discussed for FIG. 3B), it is necessary to keep track of which main memory address is using each cache line at a given time. Tag RAM 106 identifies which of the possible main memory locations that may share a particular cache line is currently using it. Data RAM 107 is where actual data is stored in cache 105.

Figure 2A:
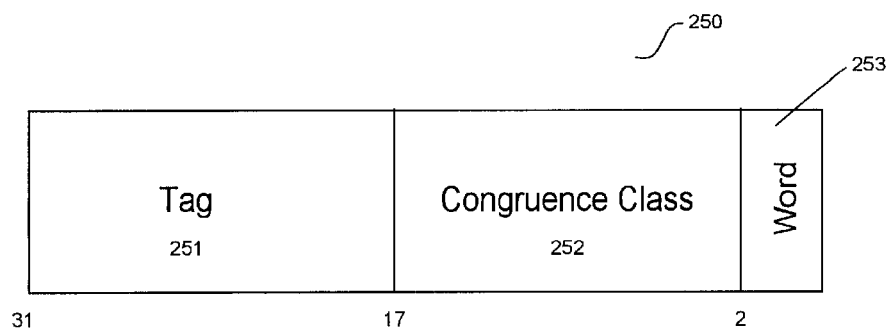
FIG. 2A is a graphical representation of a cache memory according to the present invention.
Figure 2B:
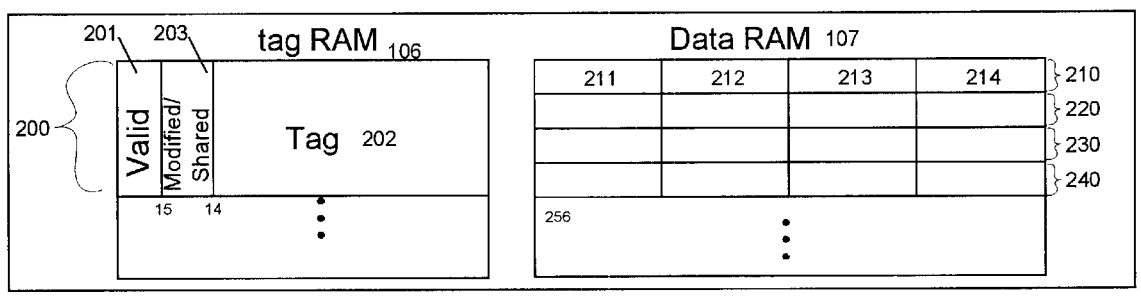
FIG. 2B is a graphical representation of a 32-bit instruction processor request according to the present invention.

First instruction processor 101 sends a request to cache controller 102 that represents the information first instruction processor 101 is looking for at a given time. FIG. 2A provides an example of a 32-bit instruction processor request 250. Although FIG. 2A demonstrates a 32-bit instruction processor request 250, it should be appreciated that an instruction processor request may be any number of bits. When first instruction processor 101 sends out 32-bit request 250, it is considered in three sections by cache controller 102: a 14-bit tag 251, a 16-bit congruence class 252, and a 2-bit word 253. 16-bit congruence class 252 directs cache controller 102 to a particular tag RAM address 200 (as shown in FIG. 2B). 14-bit tag 251 tells cache controller 102 the particular data first instruction processor 101 would like to access. Therefore, when cache controller 102 conducts a lookup in tag RAM 106, as requested by first instruction processor 101, congruence class 252 directs cache controller 102 to the proper tag RAM address 200 (as shown in FIG. 2B). Once at tag RAM address 200, cache controller 102 compares 14-bit tag 251 in 32-bit processor request 250 with 14-bit tag 202 (as shown in FIG. 2B) located in tag RAM 106.

FIG. 2B details the contents of tag RAM 106 and data RAM 107 according to the present invention. Tag RAM 106 comprises a tag RAM address 200. A 16-bit tag RAM address 200 may use a 14-bit tag 202 to identify a main memory address that is using a cache data line 210, 220, 230, and 240, 1-bit 202 to determine validity, and 1-bit 203 to determine the "modification/shared" status of cache entry. Data RAM 107 stores data associated with tag RAM 106. Data RAM 107 may be organized as a set of individual cache data lines 210, 220, 230, and 240. Each cache line 210, 220, 230, and 240 is associated with a particular tag RAM address. For example, the following discussion will assume that cache data line 210 is associated with tag RAM address 200. Cache data line 210 may contain four data words 211, 212, 213, and 214. Each data word 211, 212, 213, and 214 may be eight bytes, and thus cache line 210 may have 32 bytes, or 256 bits. Therefore, each time cache 105 is written to or read from, a transfer of 32 bytes takes place. Although the present invention describes a cache data line of four words of eight bytes each, it should be appreciated that a data line may be any number of words of any number of bytes each. As will be described later in more detail, "modification/shared" status bit 203 indicates whether cache data line 210 in data RAM 107 has been modified while in cache 105. Although FIG. 2B shows a 16-bit tag RAM 106, it should be appreciated that tag RAM 106 may be any number of bits.

Referring back to FIG. 1, if a cache "hit" occurs with tag RAM address 200, cache controller 102 sends cache data line 210 back to first instruction processor 101. When a cache "miss" occurs with tag RAM address 200, first instruction processor 101 must proceed to main memory 104 to get the requested information. Following a cache "miss," cache controller 102 issues a Replace Fetch command to fetch queue (FQ) buffer 114. FQ buffer 114 holds the address of the Replace fetch command until memory bus 104 is ready to receive it. FQ buffer 114 then retrieves first instruction processor's 101 request from main memory 104 via memory bus 103. If a Replace is required because cache data line 210 has been modified while in cache 105, a Replace Store command is queued in store queue (SQ) buffer 112 in order to send non-matching tag address 200 and its associated cache data line 210 to main memory 104. SQ buffer 112 holds non-matching tag address 200 and its associated cache data line 210 until memory bus 103 is ready to transport it back to main memory 104.

Often, a second instruction processor 116 (or any other agent coupled to memory bus 103) issues a request for information residing in cache 105. In this instance, cache 105 has an obligation to provide the information to second instruction processor 116, especially if data has been modified as it resided in cache 105. This operation is called a Return. In order for first instruction processor 101 to know that second instruction processor 116 is requesting information that is in its cache 105, all requests on memory bus 103 must be "snooped" by first instruction processor 101. By snooping memory bus, first instruction processor 101 is alerted to second instruction processor's 116 request, and thus can fulfill its obligation of providing the information.

A Snoop tag RAM 109 performs this monitoring function. Snoop tag RAM 109 is coupled to an Input Queue (IQ) buffer 110. Requests from second instruction processor 116 (as well as other memory bus traffic) are retrieved from memory bus 103 and enter IQ buffer 110. IQ buffer 110 holds requests from second instruction processor 116 until snoop tag RAM 109 is ready to determine if information requested by second instruction processor 116 resides in tag RAM 106. Because snoop tag RAM 109 is a replica of tag RAM 106, snoop tag RAM 109 compares requests from second instruction processor 116. If there is not a match, information remains in IQ buffer 110 and eventually is moved to IQ output register 115. As will be discussed in more detail later, IQ output register 115 allows the necessary compares to occur up to the clock on which data is put on memory bus 103. Information in IQ output register 115 is purged as it is overwritten with new entries from IQ buffer 110.

If there is a match, snoop tag RAM 109 directs IQ buffer 110 to send the matching address to cache controller 102 via a Return Queue Address (RQA) buffer 108. Cache controller 102 then retrieves data requested by second instruction processor 116 from data RAM 107 and sends it to a Return Queue Data (RQD) buffer 113. RQD buffer 113 holds the requested data until memory bus 103 is ready to deliver it to second instruction processor 116. Allowing snoop Tag RAM 109 to snoop memory bus 103, instead of requiring tag RAM 106 to snoop, keeps tag RAM 106 from being overloaded and thus prevents increased latency. In addition, because snoop tag RAM 109 operates on a bus clock domain 118 (unlike tag RAM 106 that operates on a core clock domain 117), unacceptable snoop stall states on the memory bus 103 are prevented.

Memory bus 103 operates on bus clock domain 118, while cache 105 operates on core clock domain 117. Often, bus clock domain 118 is asynchronous with respect to core clock domain 118. As a result, a Replace operation, which writes information to SQ buffer 112 on core clock domain 118, is asynchronous with respect to a Return operation, which writes information to IQ buffer 110 on bus clock domain 118. A comparator 111 is coupled between SQ buffer 112 and IQ buffer 110 to ensure that snoop tag RAM 109 does not relay a cache "miss" to second instruction processor's 116 Return request, where the requested information is in transit from cache controller 102 to SQ buffer 112, as a result of a Replace operation.

Comparator 111 compares IQ buffer 110 to SQ buffer 112 for all snoopable bus transactions. Comparator 111 also compares IQ output register 115 to SQ buffer 112 for all snoopable bus transactions. Because IQ buffer 110 and IQ output register 115 are written to on bus clock domain 118 and SQ buffer 112 is written to on core clock domain 117, comparator 111 must conduct a series of compares between IQ buffer 110 and SQ buffer 112, and between IQ output register 115 and SQ buffer 112. Because of the asynchronicity between a Replace and a Return, comparator 111 also must reverse and compare SQ buffer 112 to IQ buffer 110, and SQ buffer 112 to IQ output register 115. As discussed later in FIG. 4, the number of compares necessary and the time interval for each compare may vary with the particular memory bus architecture.

Figure 3:
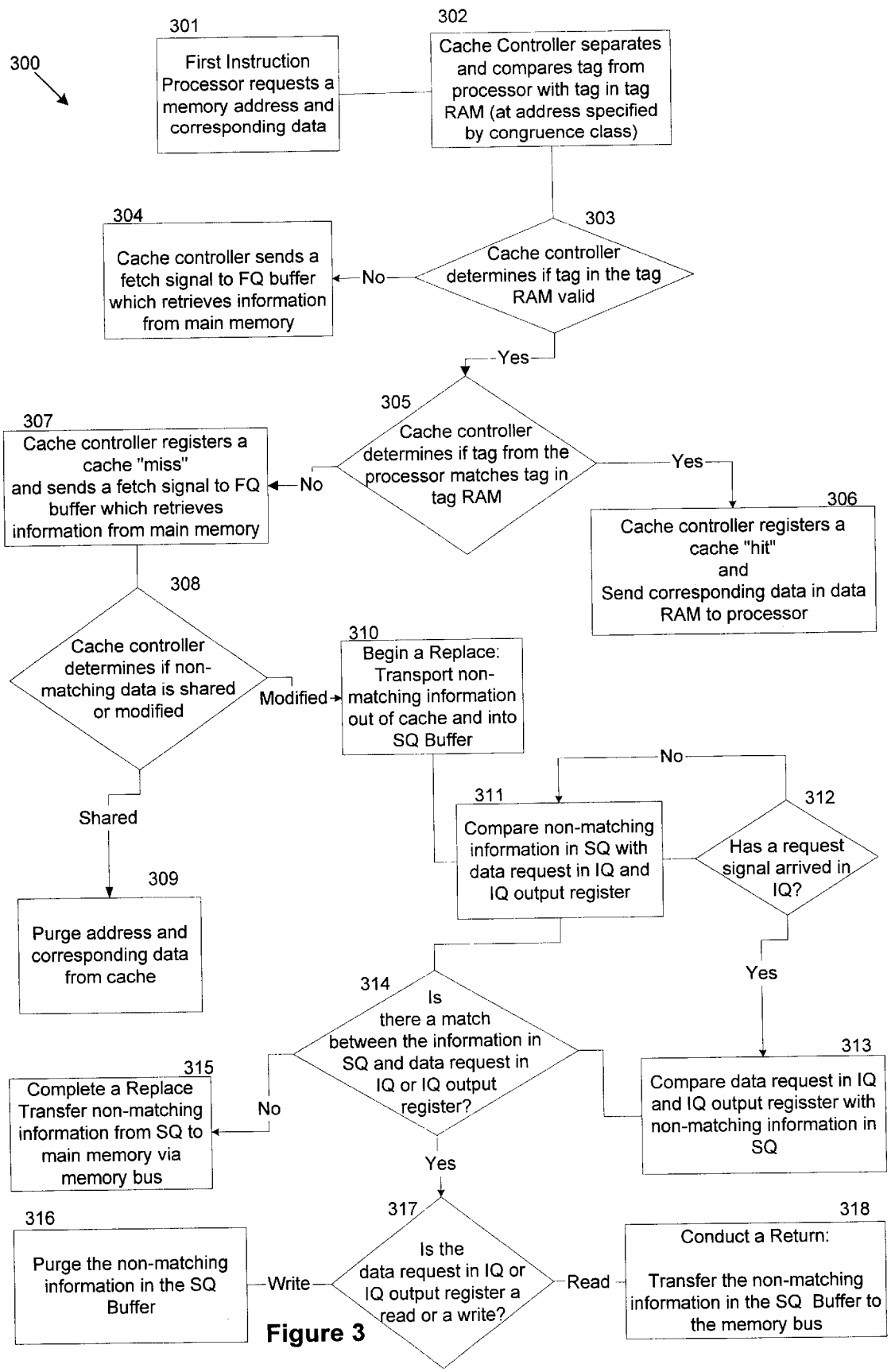
FIG. 3 is a flowchart detailing a computer information routing process according to a preferred embodiment of the present invention.

FIG. 3 is a flowchart detailing a computer information routing process 300 according to a preferred embodiment of the present invention. In step 301, first instruction processor 101 provides a 32-bit request 250 comprising tag 251, congruence class 252 and word 253 to cache controller 102. 32-bit request 250 represents a memory address and corresponding data desired by first instruction processor 101. In step 302, cache controller 102 separates and compares tag 251 from 32-bit request 250 with tag 202 in tag RAM 106. In step 303, cache controller 102 first determines whether tag 202 in tag RAM 106 is valid by checking valid bit 201. If valid bit 201 is not set, tag 202 is not valid, and process 300 proceeds to step 304. In step 304, cache controller 102 sends a fetch signal to FQ buffer 114. FQ buffer 114 eventually retrieves the desired information from main memory 104. If, on the other hand, valid bit 201 is set and tag 202 is valid, cache controller 102 proceeds to step 305. In step 305, cache controller 102 compares tag 251 in 32-bit request 250 to tag 202 in tag RAM 106. If tag 251 matches tag 202 a cache "hit" is registered and corresponding data 210 (comprising words 211, 212, 213, and 214) in data RAM 107 is sent to first instruction processor 101, as shown in step 306. If, on the other hand, tag 251 does not match tag 202 a cache "miss" is registered, and cache controller 102 sends a fetch signal to FQ buffer 114. FQ buffer 114 eventually retrieves the desired information from main memory 104, which is provided to first instruction processor 101, as shown in step 307.

The next portion of process 300 describes how non-matching tag 202 and its corresponding data 210 are routed after a cache "miss." In step 308, cache controller 102 checks "modified/shared" bit 203 to determine whether non-matching tag 202 and its corresponding cache data line 210 have been "modified" while in cache 105, or whether cache data line 210 is still "shared" with main memory 104. If cache data line 210 is still "shared" with main memory 104, cache controller 102 will purge non-matching tag 202 and its corresponding cache data line 210 from cache 105, as shown in step 309. If, on the other hand, cache data line 210 has been "modified" while in cache 105, a Replace function will commence. As shown in step 310, for a Replace function non-matching tag 202 and its corresponding cache data line 210 will be transported from cache 105 and into SQ buffer 112.

In step 311, comparator 111 compares non-matching tag 202 and its corresponding cache data line 210 in SQ buffer 112 to a data request in IQ buffer 110 or in IQ output register 115. In step 312, comparator 111 continues to make the comparison in step 311 until a request signal arrives in IQ buffer 110, or until information in SQ buffer 112 matches data request in IQ buffer 110 or in IQ output register 115 (as shown in step 314). As shown in steps 312 and 313, when a request signal arrives in IQ buffer 110, comparator 111 reverses and compares the data request in IQ buffer 110 to non-matching tag 202 and its corresponding cache data line 210 in SQ buffer 112. Step 314 shows that if a match has not occurred in either of steps 311 or 313, process 300 is directed to step 315. In step 315, a Replace operation is completed by transferring non-matching tag 202 and its corresponding cache data line 210 to main memory 104 via memory bus 103. If, on the other hand, step 314 identifies a match in either of steps 311 or 313, process 300 proceeds to step 316. In step 316, if there is a match between the information in SQ buffer 112 and data request in IQ buffer 110 or in IQ output register 115, an operation identical to a standard Return is conducted. Specifically, cache controller 102 provides tag 202 and its corresponding cache data line 210 (still located in cache 105) to memory bus 103 via RQD buffer 113.

Figure 4A:
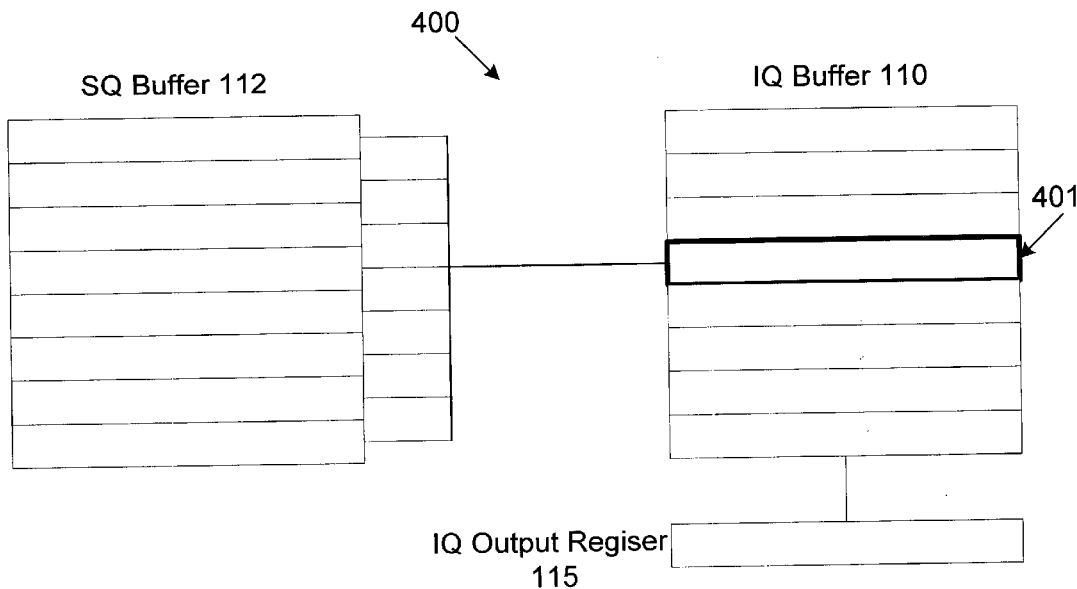
FIGS. 4A, 4B, and 4C are block diagrams of three time region compares, respectively, according to the present invention.
Figure 4B:
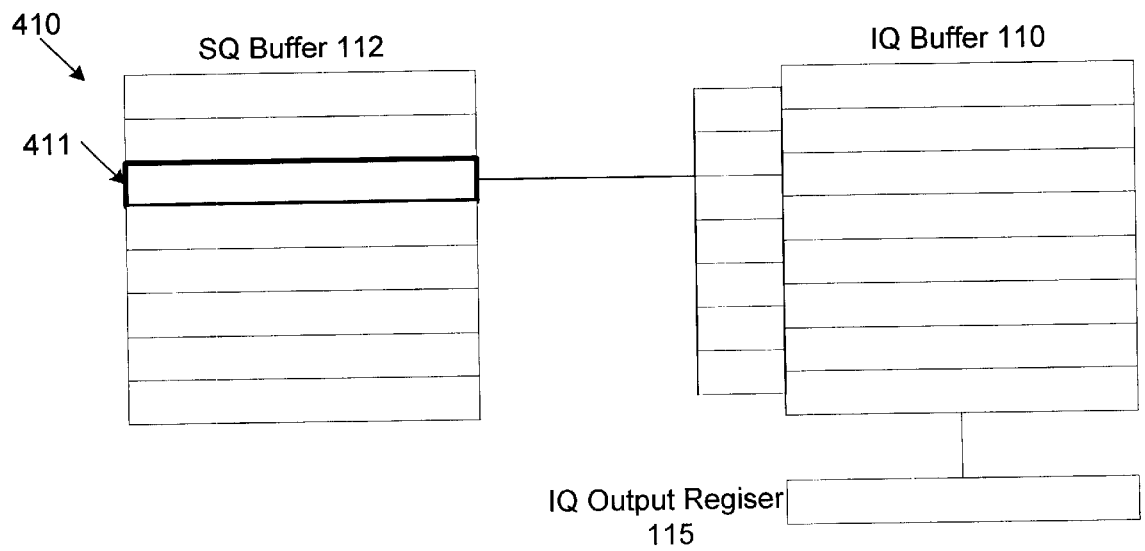
Figure 4C:
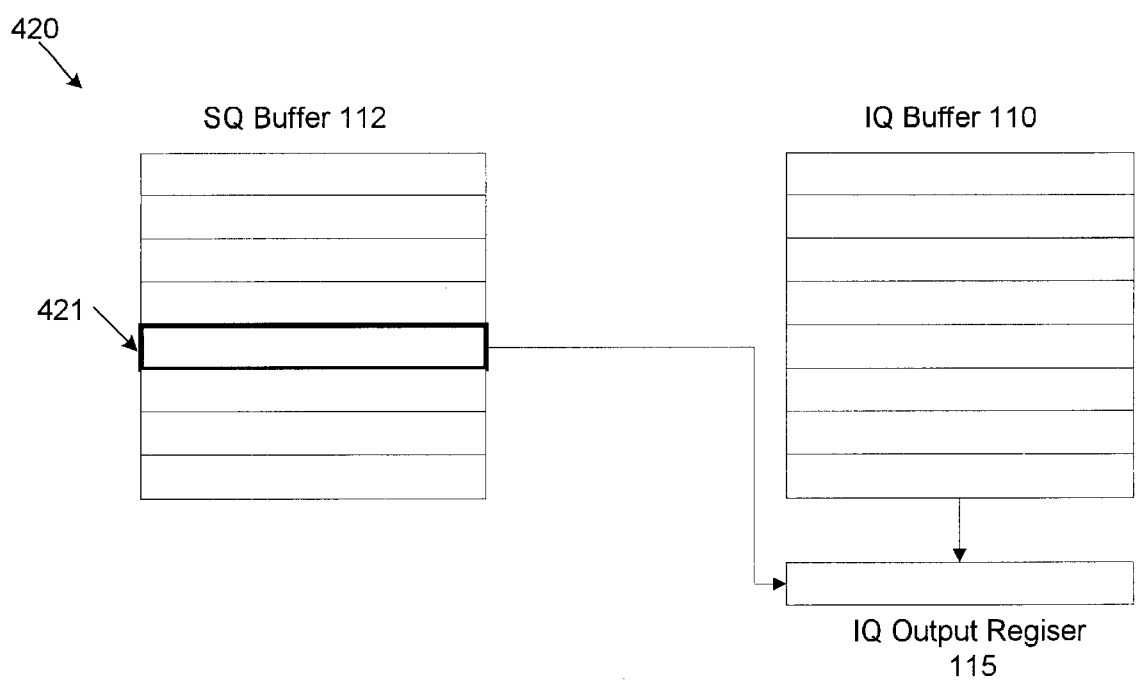

FIGS. 4A, 4B, and 4C show three distinct time regions over which comparator 111 may compare SQ buffer 112 to IQ output register 115 and IQ buffer 111. Although FIGS. 4A, 4B, and 4C show three regions, it should be appreciated that the number of necessary time regions may vary with the particular memory bus architecture. FIG. 4A shows a first time region 500. In the present preferred embodiment, first time region 500 defines a sequence of clock pulses up to a pulse in which a new entry 501 is observed in IQ buffer 110. New entry 501 in IQ buffer 110 is compared to all valid entries in SQ buffer 112. If there is a match and if new entry 501 is a write command, data in SQ buffer 112 may be purged because second instruction processor 116 is overwriting requested location. If new entry 501 is a read, data in SQ buffer 112 is placed on memory bus 103 and transferred to second instruction processor 116.

FIG. 4B shows a second time region 510. Second time region 510 occurs when new information 511 is placed in SQ buffer 112 after an entry has entered IQ buffer 110. New information 511 in SQ buffer 112 is compared to all entries in IQ buffer 110. If there is a match, data in SQ buffer 112 is purged. Second time region 510 is conducted on a single clock pulse, because a new entry that enters IQ buffer 110 after the clock pulse will be compared under first time region 500.

FIG. 4C shows a third time region 520. Third time region 520 covers a period after an entry begins to be transferred out of IQ buffer 110 and into IQ output register 115. The distinction between second time interval 510 and third time interval 520 is that third time interval 520 describes data that has left IQ buffer 110 and has entered IQ output register 115. IQ output register 115 provides a store for data that is not yet out of the data phase, but cannot remain in IQ buffer 110. In this case, a new entry 521 in SQ buffer 112 is compared to data in IQ output register 115. If there is a match new entry 521 is placed on memory bus 103.

Figure 5:
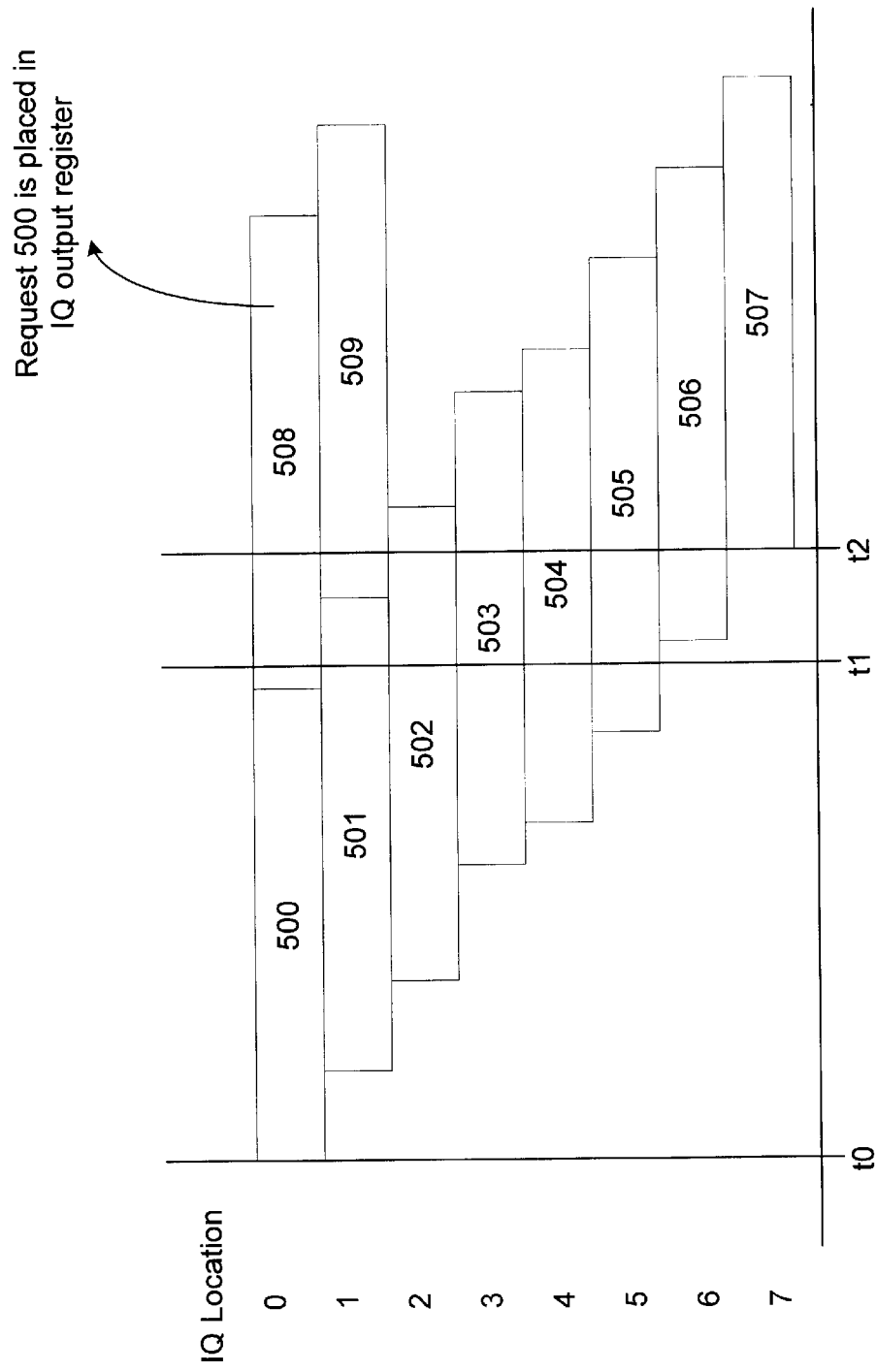
FIG. 5 is a timing diagram of the IQ buffer according to the present invention.

FIG. 5 is a timing diagram of IQ buffer 110. FIG. 5 further demonstrates the three distinct time regions over which comparator 111 may compare SQ buffer 112 to IQ output register 115 and IQ buffer 110. As shown in FIG. 5, IQ buffer 110 contains eight locations 0 through 7. Request 500 enters location 0 in IQ buffer 110 at time t0. The remaining locations receive requests successively over time. IQ buffer 110 may be a first-in-first-out (FIFO) register such that as each successive request enters IQ buffer 110, the preceding entry moves to the next location. Thus, for example, when a new request enters IQ buffer 110, request 500 moves to location 1, and thus becomes request 501. Time t1 designates the time at which a new address and its corresponding data appear in SQ buffer 112. Region 1 is defined prior to t1. In time region 1, as new requests enter IQ buffer 110 they are compared to all entries already residing in SQ buffer 112. Region 2 is defined after t1. In region 2, the new entry in SQ buffer 112 is compared to the existing requests in IQ buffer 110. As request 508 is placed in IQ buffer 110 location 0, request 500 exits IQ buffer 110 and enters IQ output register 115. Time region 3 is defined when IQ output register 115 receives a request. In region 3, the new request in IQ register 115 is compared to SQ buffer 112. At time t2, request 509 replaces request 501 in location 1 of IQ buffer 110. Request 509 will be subject to a region 1 compare (i.e., IQ buffer 110 will be compared to SQ buffer 112).

CONCLUSION

In sum, the present invention provides an improved system and method for routing information from a cache memory in a computer. An important feature of the preferred embodiments of the invention is comparing information from the cache memory and a portion of a signal from a memory bus. It is understood, however, that the invention is susceptible to various modifications and alternative constructions, and that there is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor and a storage medium readable by the processor (including volatile and non-volatile memory and/or storage elements). Program code is applied to data entered using the input device to perform the functions described above and to generate output information. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic diskette) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

We claim:

1. A method for routing information from a cache memory, comprising:

transferring said information from said cache memory; and comparing said information and a portion of a signal while said information is in transit from said cache memory, wherein said information is transferred from said cache memory on a first clock signal, and wherein said portion of said signal is provided from a memory bus on a second clock signal that is asynchronous with said first clock signal.

2. The method of claim 1, further comprising delivering said information to a memory bus when said information matches said portion of said signal, and when said signal is a read command.

3. The method of claim 1, further comprising preventing said information from entering a memory bus when said information matches said portion of said signal and when said signal is a write command.

4. The method of claim 1, further comprising transferring said information to a main memory via a memory bus when said information does not match said portion of said signal.

5. The method of claim 1, wherein said signal is provided by one or more agents coupled to a memory bus.

6. The method of claim 1, wherein said information is compared to said portion of said signal for a first time interval, and wherein said portion of said signal is compared to said information for a second time interval.

7. A method for routing information from a cache memory, comprising:

transferring said information from said cache memory to a first buffer element on a first clock signal;

transferring a request signal from a memory bus to a second buffer element on a second clock signal that is asynchronous with the first clock signal;

comparing said information in said first buffer element to a portion of said request signal in said second buffer element for a first time interval; and comparing said portion of said request signal in said second buffer element to said information in said first buffer element for a second time interval.

8. The method of claim 7, further comprising transferring said information from said first buffer element to said memory bus when said information matches said portion of said request signal, and when said request signal is a read command.

9. The method of claim 7, further comprising purging said information from said first buffer element when said information matches said portion of said request signal, and when said request signal is a write command.

10. The method of claim 7, further comprising transferring said information from said first buffer element to a main memory via said memory bus when said information does not match said portion of said request signal.

11. The method of claim 7, wherein said request signal is provided by one or more agents coupled to said memory bus.

12. The method of claim 7, wherein said steps of comparing are conducted on said first clock signal.

13. The method of claim 12, wherein said first time interval comprises a plurality of clock pulses on said first clock signal up to a clock pulse in which said second buffer element receives said request, and wherein said second time interval comprises one clock pulse on said first clock signal after said first buffer element receives said information.

14. A computer system, comprising:
a processor;
a cache memory coupled to said processor, wherein said cache memory transfers information to a first buffer element, and wherein one or more agents coupled to said memory bus transfer a request signal to a second buffer element;
a plurality of buffer elements coupled to said cache memory;
a memory bus coupled to said plurality of buffer elements; and
a comparator device coupled between two or more of said plurality of buffer elements for comparing said buffer elements.

15. The computer system of claim 14, wherein said comparator compares said information in said first buffer element to a portion of said request signal is said second buffer element for a first time interval, and wherein said comparator compares said portion of said request signal in said second buffer element to said information in said first buffer element for a second time interval.

16. The computer system of claim 15, wherein said information is transferred from said first buffer element to said memory bus when said information matches said portion of said request signal, and when said request signal is a read command.

17. The computer system of claim 15, wherein said information is purged from said first buffer element when said information matches said portion of said request signal, and when said request signal is a write command.

18. The computer system of claim 15, wherein said information is transferred from said first buffer element to a main memory via said memory bus, when said information does not match said portion of said request signal.

19. The computer system of claim 15, wherein said information is transferred to said first buffer element on a first clock signal, and wherein said request signal is transferred to said second buffer element on a second clock signal that is asynchronous with said first clock signal.

20. The computer system of claim 19, wherein said comparator conducts said compares on said first clock signal.

21. The computer system of claim 20, wherein said first time interval comprises a plurality of clock pulses on said first clock signal up to a clock pulse in which said second buffer element receives said request, and wherein said second time interval comprises one clock pulse on said first clock signal after said first buffer element receives said information.

22. A computer system, comprising:
a processor;
a cache memory coupled to said processor;
a first buffer element coupled to said cache memory and to a memory bus, wherein said cache memory transfers information to said first buffer element on a first clock signal;
a second buffer element coupled to said memory bus, wherein said second buffer element receives a request signal from said memory bus on a second clock signal that is asynchronous from said first clock signal; and
a comparator device coupled to said first buffer element and to said second buffer element for comparing said first buffer element to said second buffer element for a first time interval, and for comparing said second buffer element to said first buffer element for a second time interval, wherein said information is transferred from said first buffer element to said memory bus when said information matches a portion of said request signal and when said request signal is a read command, and wherein said information is purged from said first buffer element when said information matches said portion of said request signal and when said request signal is a write command, and further wherein said information is transferred from said first buffer element to a main memory via said memory bus when said information does not match said portion of said request signal.

23. The computer system of claim 22, wherein said comparator conducts said compares on said first clock signal, and wherein said first time interval comprises a plurality of clock pulses on said first clock signal up to a clock pulse in which said second buffer element receives said request, and wherein said second time interval comprises one clock pulse on said first clock signal after said first buffer element receives said information.

* * * * *